US008755142B2

United States Patent
Grobis et al.

(10) Patent No.: US 8,755,142 B2
(45) Date of Patent: Jun. 17, 2014

(54) MAGNETIC RECORDING DISK DRIVE WITH METHOD FOR DATA PRESERVATION DURING HIGH TRACK MISREGISTRATION (TMR) ENVIRONMENT

(75) Inventors: Michael Konrad Grobis, San Jose, CA (US); Manfred Ernst Schabes, Saratoga, CA (US)

(73) Assignee: HGST Netherlands B.V., Amsterdam (NL)

( * ) Notice: Subject to any disclaimer, the term of this patent is extended or adjusted under 35 U.S.C. 154(b) by 45 days.

(21) Appl. No.: 13/528,794

(22) Filed: Jun. 20, 2012

(65) Prior Publication Data

US 2013/0342931 A1    Dec. 26, 2013

(51) Int. Cl.
*G11B 5/54* (2006.01)

(52) U.S. Cl.
USPC .............. 360/77.01; 360/75; 360/62; 360/45

(58) Field of Classification Search
USPC ............ 360/63, 55, 64, 62, 71, 75, 77.01, 48, 360/45
See application file for complete search history.

(56) References Cited

U.S. PATENT DOCUMENTS

| 5,805,372 | A  | * | 9/1998  | Hoogendoorn et al. | ... 360/77.01 |
| 6,442,705 | B1 | * | 8/2002  | Lamberts | ........................... 714/2 |
| 6,556,369 | B1 | * | 4/2003  | Kanamaru et al. | .............. 360/75 |
| 6,781,780 | B1 | * | 8/2004  | Codilian | ......................... 360/60 |
| 7,082,007 | B2 | * | 7/2006  | Liu et al. | .................... 360/77.02 |
| 7,170,700 | B1 | * | 1/2007  | Lin et al. | ......................... 360/31 |
| 7,617,358 | B1 | * | 11/2009 | Liikanen et al. | .............. 711/112 |
| 7,738,208 | B2 | * | 6/2010  | Kim et al. | ....................... 360/60 |
| 2001/0048570 | A1 | * | 12/2001 | AbouJaoude et al. | ..... 360/77.04 |
| 2007/0139809 | A1 | * | 6/2007  | Liikanen et al. | ................ 360/75 |
| 2012/0063023 | A1 | * | 3/2012  | Mathew et al. | ................. 360/45 |
| 2012/0307400 | A1 | * | 12/2012 | Kawabe | ..................... 360/77.01 |

\* cited by examiner

*Primary Examiner* — Thomas Alunkal
(74) *Attorney, Agent, or Firm* — Thomas R. Berthold

(57) ABSTRACT

A hard disk drive (HDD) has a high track misregistration (TMR) mode of writing data. If the position error signal (PES) from the servo positioning information exceeds a first write inhibit threshold (WI-1), writing is not inhibited but a high TMR mode of operation is enabled. In high TMR mode, prior to writing data to the target track, the data on the adjacent tracks is read and stored in a buffer. The data to be written to the target track is also stored in the buffer, and is flagged to indicate that the data needs to be written. The data is then written to the target track. However, if during writing the PES exceeds a second threshold (WI-2), then the data from the adjacent encroached track in the buffer is flagged for writing and the process repeated with the encroached track set as the target track.

16 Claims, 4 Drawing Sheets

MAGNETIC RECORDING DISK DRIVE WITH METHOD FOR DATA PRESERVATION DURING HIGH TRACK MISREGISTRATION (TMR) ENVIRONMENT

BACKGROUND OF THE INVENTION

1. Field of the Invention

This invention relates generally to magnetic recording hard disk drives (HDDs), and more particularly to a HDD that is operable in environments where track misregistration (TMR) of the write head occurs.

2. Description of the Related Art

HDDs with high data density are required to have high data track density, which means that the concentric data tracks are packed closer together. High track density increases the problem of adjacent track encroachment of the write field from the write head if the write head is not precisely located on the target data track during writing. This track misregistration (TMR) can cause overwriting (erasure) of data in adjacent tracks, which results in unrecoverable data when the data on the adjacent tracks is attempted to be read back later. One prior art solution is to place the data tracks farther apart, i.e., increase the track pitch. However, this decreases the overall data density of the disk drive. Another solution is to inhibit writing whenever the disk drive's servo control electronics detects that TMR has occurred or is about to occur. However, in a high TMR environment this may cause write inhibit to be continuously enabled, thereby degrading performance of the disk drive.

What is needed is a HDD with increased data track density that remains operational even in high TMR environments.

SUMMARY OF THE INVENTION

The invention relates to a HDD that is operable in high TMR environments. The HDD is capable of operation in several modes. In normal mode data is written to the data tracks as long as the position error signal (PES) from the servo positioning information in the data tracks is less than a first predetermined write inhibit threshold (WI-1). However, if the PES exceeds WI-1, writing is not inhibited but a high TMR mode of operation is enabled. The WI-1 threshold may be exceeded if the PES continuously exceeds a predetermined threshold for a predetermined time period or if the PES exceeds a threshold a predetermined number of times within a predetermined time period. In high TMR mode, prior to writing data to the target track, the data on the adjacent tracks is read and stored in a buffer region of memory along with the track numbers. The data to be written to the target track is also stored in the buffer, and is flagged to indicate that the data needs to be written to the disk. The data is then written to the target track and the PES is monitored. If the PES exceeds a second predetermined threshold (WI-2) then the data from the adjacent encroached track in the buffer is flagged for writing. The process is then repeated with the encroached track now set as the target track. If WI-2 was not exceeded when writing data to the target track then the disk drive proceeds to write any remaining flagged tracks in the buffer to their respective target tracks, using the same protocol.

Because the size of the buffer is finite and is also being filled by other write requests from the host computer, the HDD utilizes a buffer fill threshold (BFT). If during high TMR mode, the buffer fill exceeds BFT, the HDD notifies the user and switches to a hibernation mode during which data is not read or written. When the PES falls below WI-1, the hibernation and high TMR modes are disabled and data from the buffer is written to the tracks.

For a fuller understanding of the nature and advantages of the present invention, reference should be made to the following detailed description taken together with the accompanying figures.

DETAILED DESCRIPTION OF THE INVENTION

Figure 1:
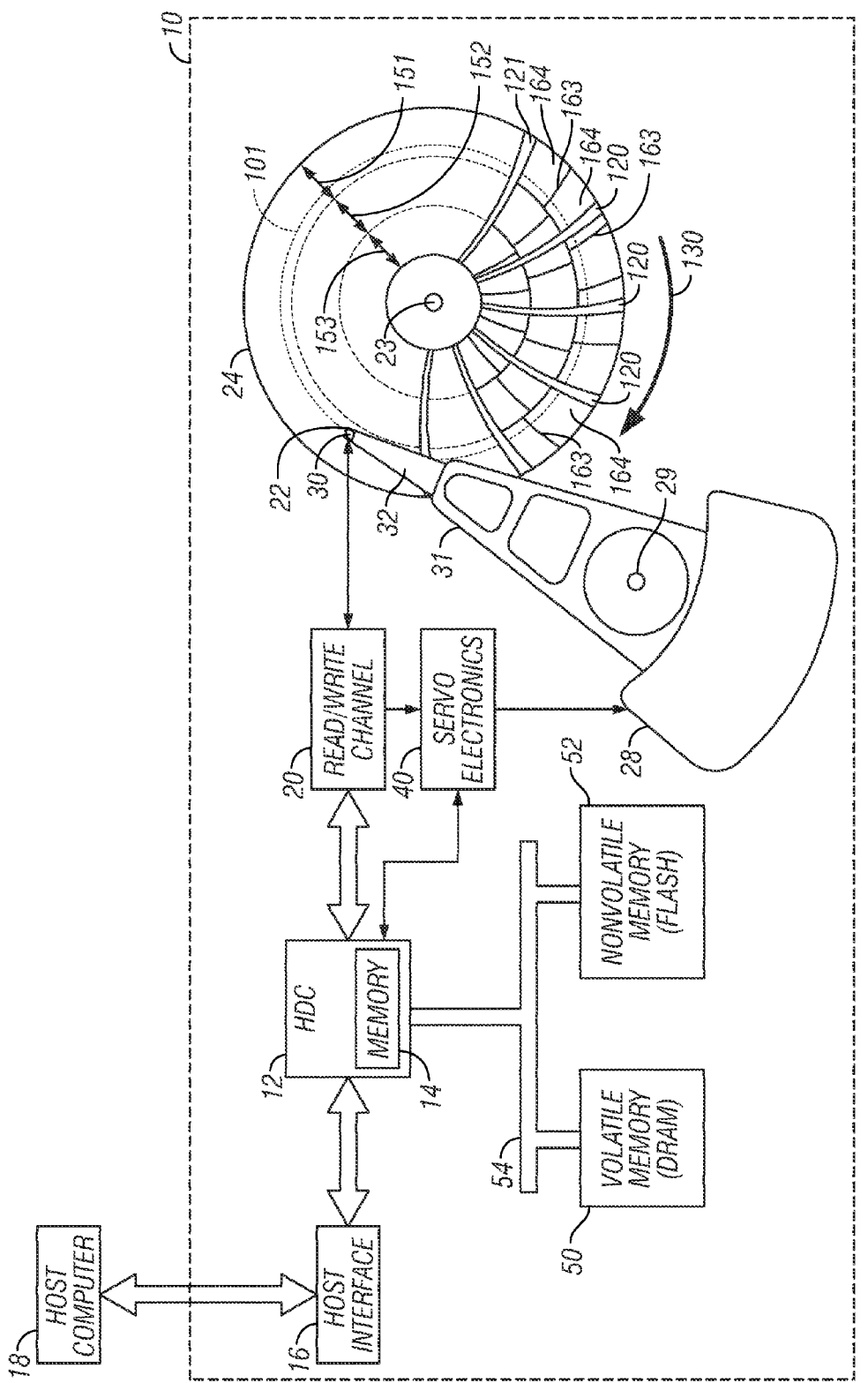
FIG. 1 is a block diagram of a magnetic recording disk drive (HDD) operable with the method of the invention.

FIG. 1 is a block diagram of a magnetic recording disk drive (HDD) 10 operable with the method according to this invention. The HDD 10 includes a hard disk controller (HDC) 12 that can include and/or be implemented by a microcontroller or microprocessor. The controller 12 runs a computer program that is stored in semiconductor memory 14 and that embodies the logic and algorithms described further below. The memory 14 may be separate from controller 12 or as embedded memory on the controller chip. The computer program may also be implemented in microcode or other type of memory accessible to the controller 12.

The controller 12 is connected to a host interface 16 that communicates with the host computer 18. The host interface 16 may be any conventional computer-HDD interface, such as Serial ATA (Advanced Technology Attachment) or SAS (Serial Attached SCSI).

While the top view of FIG. 1 shows only a single disk 24 and associated read/write head 22, the HDD 10 typically includes a stack of disks that are mounted on a spindle 23 and rotated by a spindle motor (not shown), with each disk surface being associated with one of the heads 22. The read/write head 22 is typically a combination of an inductive write head with a magnetoresistive read head and is located on the trailing end or end face of a head carrier or slider 30. Slider 30 is supported on the actuator arm 31 by a suspension 32 that enables the slider to "pitch" and "roll" on an air-bearing generated by the disk 24 as it rotates in the direction of arrow 130. The actuator arm 31 is attached to a rotary voce coil motor (VCM) actuator 28 that rotates about pivot 29. Thus as the actuator 28 pivots, the path of slider 30 with attached read/write head 22 is not aligned with a disk radius, but is an arcuate path (like that shown by servo sectors 120 described below).

The disk 24 has radially-spaced concentric data tracks, one of which is shown as track 101. Each data track has a reference index 121 indicating the start-of-track. The HDD 10 is illustrated as a zone-bit-recording (ZBR) HDD because the data tracks are grouped radially into a number of annular data bands or zones, three of which are shown as zones 151, 152 and 153, but the invention is fully applicable to a HDD that does not use ZBR, in which case the HDD would have only a single data zone. Within each zone, the tracks are also circumferentially divided into a number of contiguous physical data sectors, such as typical data sectors 164 in the radially outer data zone 151. Each data sector 164 is preceded by a synchronization (sync) field, such as typical sync fields 163. The sync fields 163 are detectable by the read head for enabling synchronization of reading and writing the data bits in the data sectors 164. A sync field 163 is a nondata region on the disk that is magnetized each time data is written in its associated data sector 164.

Each data track also includes a plurality of circumferentially or angularly-spaced servo sectors 120 that contain positioning information detectable by the read head for moving the head 22 to desired data tracks and maintaining the head 22 on the data tracks. The servo sectors in each track are aligned circumferentially with the servo sectors in the other tracks so that they extend across the tracks in a generally radial direction, as represented by radially-directed servo sectors 120. The servo sectors 120 are nondata regions on the disk that are magnetized once, typically during manufacturing or formatting of the disk, and are not intended to be erased during normal operation of the HDD. Each of the servo sectors 120 in a data track typically contains a servo timing mark (STM) that indicates the start of the servo sector, a track identification (TID) code, and a portion of a pattern of magnetized blocks or high-frequency bursts that form head position error signal (PES) fields. The PES fields are detected by the read head and decoded to provide a PES, which is a measure of how far the head is off track from the track centerline. Typically there are multiple data sectors 164 located between the servo sectors 120.

The electronics associated with HDD 10 also includes servo electronics 40. In the operation of HDD 10, the read/write channel 20 receives signals from head 22 and passes servo information from the servo sectors 120 to servo electronics 40 and data signals from the data sectors 164 to controller 12. Servo electronics 40 typically includes a servo control processor that uses the servo information from the servo sectors 120 to run a control algorithm that produces a control signal. The control signal is converted to a current that drives actuator 28 to position the head 22. In the operation of HDD 10, interface 16 receives a request from the host computer 18 for reading from or writing to the data sectors 164. Controller 12 receives a list of requested data sectors from interface 16 and converts them into a set of numbers that uniquely identify the disk surface, track and data sector. The numbers are passed to servo electronics 40 to enable positioning head 22 to the appropriate data sector 164.

The controller 12 acts as a data controller to transfer blocks of write data from the host computer 18 through the read/write channel 20 for writing to the disks 24 by the heads 22, and to transfer blocks of read data from the disks 24 back to the host computer 18. HDDs typically include, in addition to the rotating disk storage, solid state memory (referred to as "cache") that temporarily holds data before it is transferred between the host computer and the disk storage. The conventional cache is dynamic random access memory (DRAM), a volatile form of memory that can undergo a significant number of write/erase cycles and that has a high data transfer rate. HDDs may also include nonvolatile memory. One type of nonvolatile memory is "flash" memory, which stores information in an array of floating gate transistors, called "cells" which can be electrically erased and reprogrammed in blocks. Thus in HDD 10, the controller 12 also communicates with volatile memory 50 (shown as DRAM) and optional nonvolatile memory 52 (shown as FLASH) via data bus 54.

To meet the demand for HDDs with high data density, the data track spacing or "pitch" has decreased, which means that the concentric tracks are packed closer together. This increases the problem of adjacent track encroachment of the write field from the write head if the write head is not precisely located on the target data track during writing. This track misregistration (TMR) can cause overwriting (erasure) of data in adjacent tracks, which results in unrecoverable data when the data on the adjacent tracks is attempted to be read back later. The frequency of TMR during operation can vary and is highly dependent on the environment in which the disk drive is operating. For example, the user may occasionally operate the disk drive in an environment, such as a moving vehicle, which can cause TMR to exceed drive tolerances over long periods of time. One prior art solution is to place the data tracks farther apart, i.e., increase the track pitch. However, this decreases the overall data density of the disk drive. Another solution is to inhibit writing whenever the servo electronics detects that TMR has occurred or is about to occur, for example by detecting if the PES has exceeded a predetermined threshold. However, in a high TMR environment this may cause write inhibit to be continuously enabled, possibly preventing crucial customer data from being written to the disk.

The disk drive of this invention is capable of operation in several modes. In normal mode data is written to the data tracks so long as the PES is less than a first predetermined write inhibit threshold (WI-1). If the PES exceeds WI-1, writing is not inhibited but a high TMR mode of operation is enabled. The high TMR mode can be triggered in several ways. In one approach for enabling high TMR, WI-1 may be exceeded if the root-mean-square (RMS) value of the PES continuously exceeds a predetermined threshold for a predetermined time period. In a second approach for enabling high TMR, WI-1 may be exceeded if the PES exceeds a threshold a predetermined number of times within a predetermined time period. During high TMR mode, the disk drive enacts a different protocol for writing data to the tracks to allow for correction of adjacent track erasure. In high TMR mode, prior to writing data to the target track, the data on the adjacent tracks is read and stored in a buffer region of memory along with the track numbers. The data to be written to the target track is also stored in the buffer, and is flagged to indicate that the data needs to be written to the disk. The data is then written to the target track and the PES is monitored. If the PES exceeds a second predetermined threshold (WI-2) then the data from the adjacent encroached track in the buffer is flagged for writing. The process is then repeated with the encroached track now set as the target track. If WI-2 was not exceeded when writing data to the target track then the disk drive proceeds to write any remaining flagged tracks in the buffer to their respective target tracks, using the same protocol.

Because the size of the buffer is finite and is also being filled by other write requests from the host computer, the invention utilizes a buffer fill threshold (BFT). If during high TMR mode, the buffer fill exceeds BFT, the disk drive notifies the user and switches to a hibernation mode during which data is not read or written. When the PES falls below WI-1, the hibernation and high TMR modes are disabled and data from the buffer is written to the tracks. The value of BFT may be adjustable as a percentage of total buffer capacity depending on track size and other uses of the buffers during operation of the disk drive.

Figure 2:
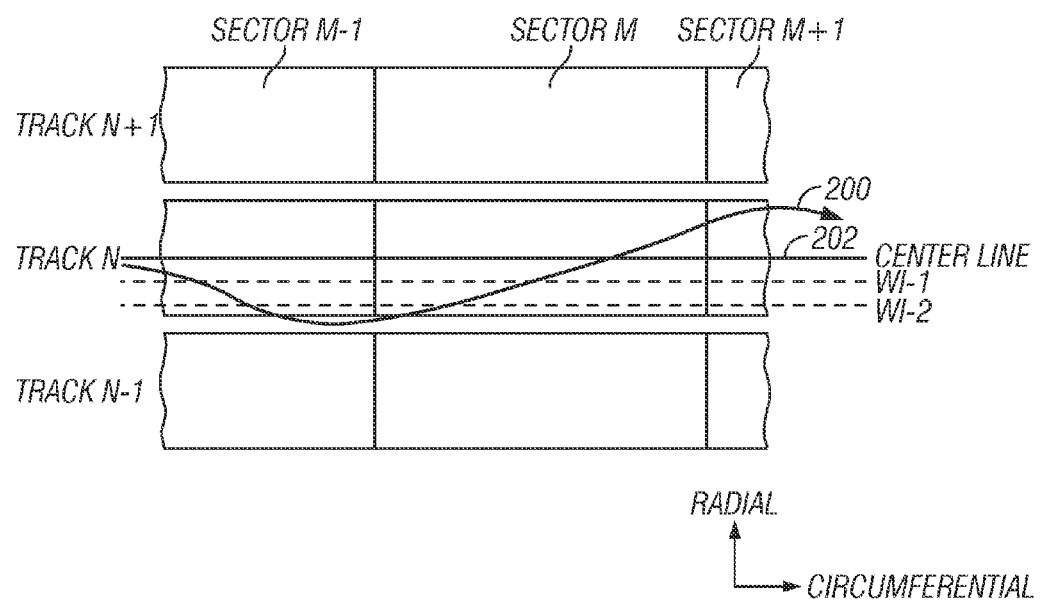
FIG. 2 is a schematic showing the path of the write head when writing data to data sectors in a target track according to the invention.

FIG. 2 is a schematic showing the path 200 of the write head when writing data to data sectors in target track N. The deviation of path 200 from the centerline 202 of track N is the TMR. Write inhibit thresholds WI-1 and WI-2 are shown for correcting erasure of data in adjacent track N−1 due to encroachment of the write field. A similar set of thresholds exist for adjacent track N+1. Threshold WI-2, for use during high TMR mode, is preferably higher than WI-1, for use during normal mode, but can be lower than WI-1. The tracks are shown with typical data sectors M−1, M and M+1. The high TMR mode of this invention may operate by reading and storing in memory all of the data sectors in tracks adjacent to the target track, or only data sectors in adjacent tracks that are adjacent to data sectors that are being written in the target track. For example, if only data sectors M and M+1 are being written in target track N, then only the adjacent data sectors in tracks N−1 and N+1 would be read and stored in memory.

Figure 3:
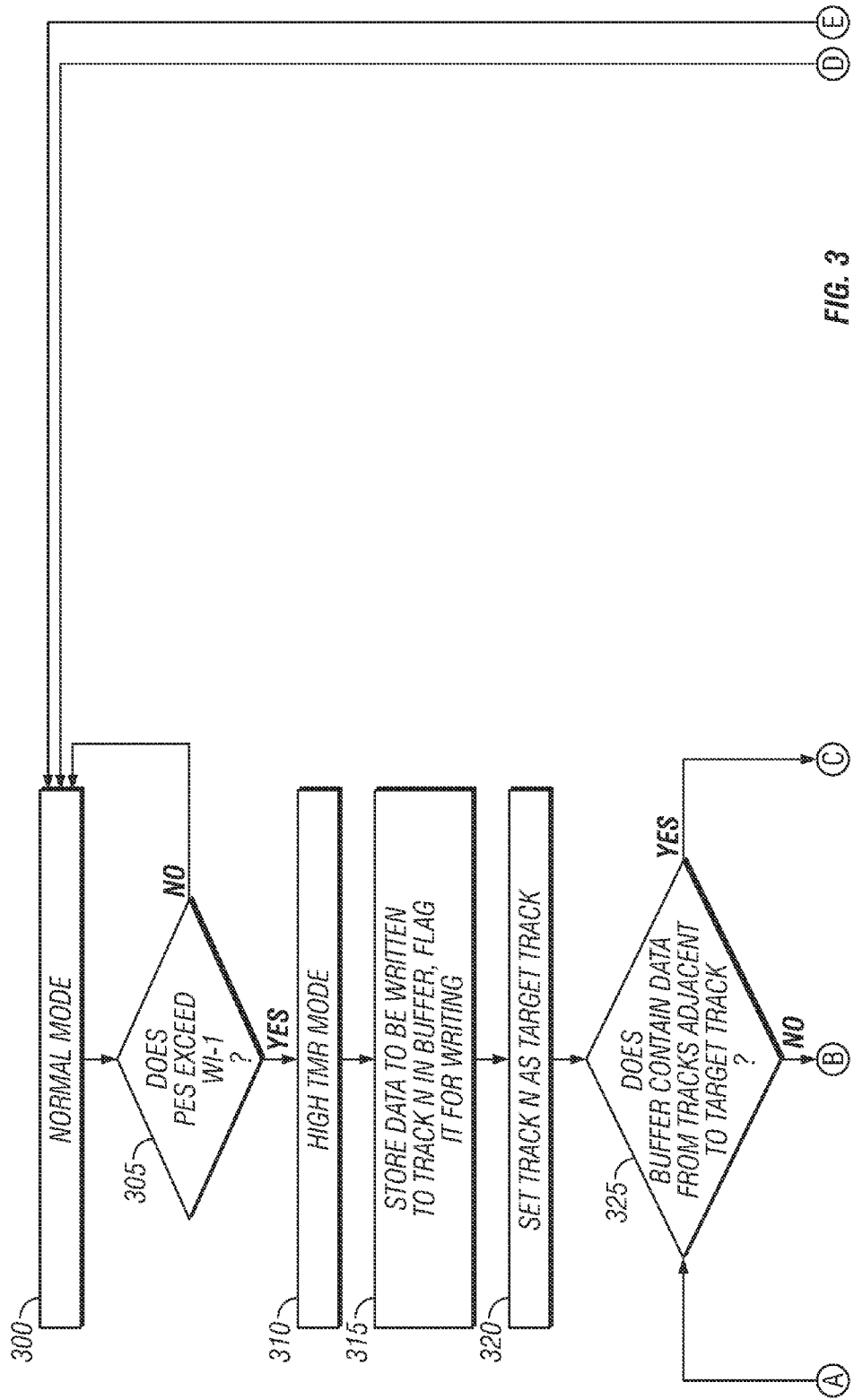
FIG. 3 is a block diagram of the high track misregistration (TMR) method of operation of the disk drive according to the invention.
Figure 3:
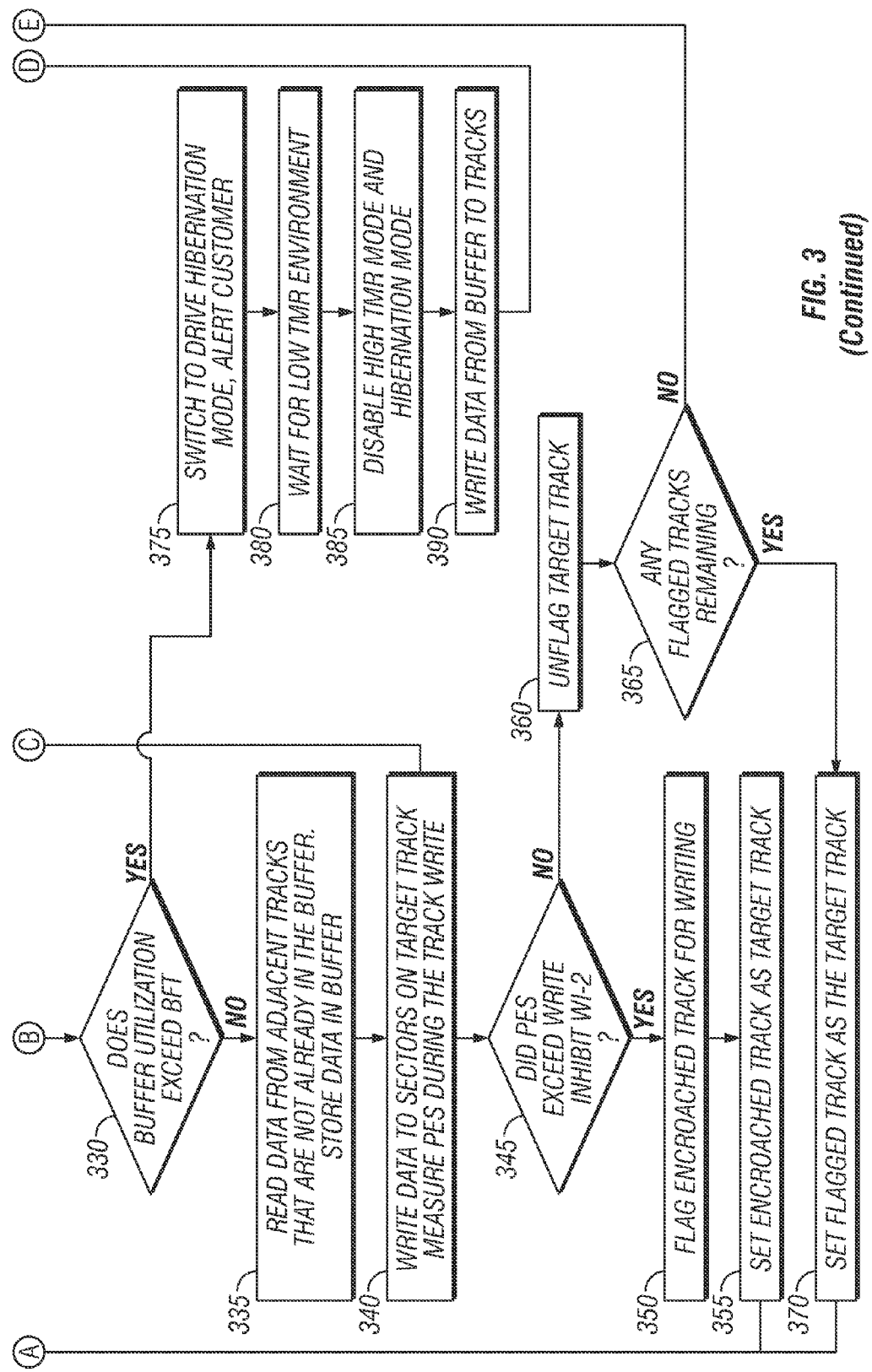

FIG. 3 is a block diagram of the method according to the invention. The disk drive operates in normal mode (300) unless the PES exceeds the first threshold WI-1 (305). Then operation switches to high TMR mode (310). The data to be written is stored in the buffer and flagged for writing (315) and track N is selected as the target track (320). Next the buffer is checked to determine if it contains data from tracks adjacent to the target track (325). If it does then operation moves to 340, but if the data for tracks adjacent to the target track are not in the buffer then the buffer is checked for utilization to see if it exceeds BFT (330). If there is sufficient space in the buffer then the data is read from the adjacent tracks and stored in the buffer (335). The data for the target track is then written to the appropriate sectors on the target track and during writing the PES is measured (340). If the PES exceeds the second write inhibit threshold WI-2 (345) the encroached track, for example track N−1, is flagged for writing (350). The encroached track is then set as the target track (355) and operation returns to 325. If the PES did not exceed WI-2 at 345, then the track just written at 340 is unflagged (360), thereby indicating data intended for the target track has been written, and a check is made to see if there are any flagged tracks remaining to be written (365). If there are then the next flagged track is set as the target track (370) and operation returns to 325. If there are no flagged tracks remaining to be written at 365, operation returns to normal mode (300).

If the buffer fill is greater than BFT (330) this indicates an exceptionally severe TMR environment and the disk drive executes additional precautionary measures to preserve data integrity. These measures may include switching to the drive hibernation mode where all incoming streams of data are flagged using a busy signal or a wait signal. The detection of a critically full buffer with buffer fill greater than BFT may also a generate a signal to the host operating system of the disk drive, therefore providing a facility to the systems administrator or user for logging and diagnostics. Thus, if at any time the check of the buffer (330) determines that the buffer fill exceeds BFT, the operation may switch to drive hibernation mode and the user is alerted (375). When a low TMR environment occurs (380), for example if the PES falls below WI-1, the high TMR mode is disabled (385) and data in the buffer is written to the tracks (390). Then the operation returns to normal mode (300).

As explained above the invention is equally applicable to writing a subset of the data sectors within a track. In that approach only data from adjacent data sectors in adjacent tracks to the target track are read and stored in the buffer, which reduces the memory overhead for the buffer. The buffer is preferably nonvolatile memory such as FLASH. A nonvolatile buffer has the advantage of protecting against losing one or more tracks of data if a power-down is required during high TMR mode. However, volatile buffers (e.g., DRAM) or a combination of volatile and nonvolatile buffers may also be used as the memory.

The above-described disk drive with high TMR mode allows for increased areal data density due to higher track density (smaller track pitch) for disk drives in certain operating environments, for example data warehouses. The higher data density is achieved while also allowing the disk drive to remain operational even in the presence of relatively rare high TMR environments.

The operation of the HDD as described above may be implemented as a set of computer program instructions stored in memory and executable by a processor, such as the HDC, or a separate controller or microprocessor in the HDD. The controller performs logical and arithmetic operations based on the program instructions stored in memory, and is thus capable of performing the functions described above and represented in the figures.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A magnetic recording disk drive comprising:
 a magnetic recording disk having a recording surface with a plurality of concentric data tracks and a plurality of servo sectors extending generally radially across the tracks, the servo sectors containing position error signal (PES) fields;
 a write head associated with said disk surface for generating a magnetic write field to write data to the tracks;
 a read head for reading data written in the tracks and for detecting the PES fields;
 servo control electronics for generating a PES in response to the PES fields detected by the read head;
 an actuator connected to the heads for positioning the write head to a target track for writing and maintaining the write head on said target track in response to the PES from the servo control electronics;
 a controller for controlling the writing of data by the write head to the tracks, the controller being operable in a normal mode wherein data is written to a target track if the PES does not exceed a first predetermined positive or negative write inhibit threshold (WI-1), wherein a positive WI-1 is associated with a first track radially adjacent the target track and a negative WI-1 is associated with a second track radially adjacent the target track and radially opposite the first radially adjacent track; and
 memory coupled to the controller and containing a program of instructions readable by the controller for operating in a high track misregistration (TMR) mode wherein data is written to the target track if the PES exceeds a positive or negative WI-1, the program of instructions undertaking the method acts comprising:
  (a) writing data intended to be written to a target track to memory;
  (b) reading data from tracks adjacent said target track and writing said adjacent track data in memory;
  (c) writing said data intended to be written to said target track to said target track;
  (d) if the PES during writing of data to said target track exceeds a second positive or negative predetermined write inhibit threshold (WI-2), wherein a positive WI-2 is associated with said first adjacent track and a negative WI-2 is associated with said second adjacent track, identifying the first or second adjacent track as an encroached adjacent track from the positive or negative WI-2 exceeded, and flagging the encroached adjacent track as the target track for writing; and reading from memory data for said encroached adjacent track, and repeating steps (b) through (d) for said flagged encroached adjacent track.

2. The disk drive of claim 1 wherein the memory includes a buffer region and wherein the writing of data to memory comprises writing data to said buffer, and wherein the method acts further comprise, prior to step (b), if the buffer fill exceeds a predetermined buffer fill threshold (BFT) inhibiting writing data to the target track.

3. The disk drive of claim 2 wherein the method acts further comprise:
  if writing is inhibited due to exceeding the BFT, disabling high-TMR mode if the PES does not exceed WI-1;
  reading data from the buffer; and
  writing buffer data to the data tracks.

4. The disk drive of claim 1 wherein the method acts further comprise, prior to step (b), determining if data from tracks adjacent said target track is in memory and if it is then skipping step (b).

5. The disk drive of claim 1 wherein the method acts further comprise if at step (d) the PES during writing of data to said target track does not exceed WI-2, unflagging said target track, thereby indicating data intended for said target track has been written to said target track.

6. The disk drive of claim 1 wherein the positive WI-2 is greater than the positive WI-1 and the negative WI-2 is more negative than the negative W1-1.

7. The disk drive of claim 1 wherein the method act of (a) comprises writing data intended to be written to selected data sectors of said target track to memory.

8. The disk drive of claim 7 wherein the method act of (b) comprises reading data from data sectors adjacent said selected data sectors of said target track and writing said data from said adjacent data sectors in memory.

9. The disk drive of claim 1 wherein exceeding one or both of WI-1 and WI-2 thresholds comprises the PES continuously exceeding a predetermined threshold for a predetermined time period.

10. The disk drive of claim 1 wherein exceeding one or both of WI-1 and WI-2 thresholds comprises the PES exceeding a predetermined threshold a predetermined number of times within a predetermined time period.

11. A magnetic recording disk drive comprising:
  a magnetic recording disk having a recording surface with a plurality of concentric data tracks and a plurality of servo sectors extending generally radially across the tracks, the servo sectors containing position error signal (PES) fields;
  a write head associated with said disk surface for generating a magnetic write field to write data to the tracks;
  a read head for reading data written in the tracks and for detecting the PES fields;
  servo control electronics for generating a PES in response to the PES fields detected by the read head;
  an actuator connected to the heads for positioning the write head to a target track for writing and maintaining the write head on said target track in response to the PES from the servo control electronics;
  a controller for controlling the writing of data by the write head to the tracks, the controller being operable in a normal mode wherein data is written to the tracks if the PES is less than a first predetermined write inhibit threshold (WI-1) and a high track misregistration (TMR) mode wherein data is written to the tracks if the PES is greater than WI-1;
  a solid state buffer accessible by the controller for storing data to be written to the tracks;
  memory coupled to the controller and containing a program of instructions readable by the controller for undertaking method acts in high TMR mode comprising:
    (a) writing data intended to be written to a target track to the buffer and flagging it for writing to said target track;
    (b) if the buffer does not contain data from tracks adjacent said target track then reading data from tracks adjacent said target track and writing said adjacent track data in the buffer;
    (c) if the buffer is filled greater than a buffer fill threshold (BFT) inhibiting writing data intended for the target track to said target track, and if it is less than BFT then writing data intended for the target track to said target track;
    (d) if the PES during writing of data to said target track is less than a second predetermined write inhibit threshold (WI-2), unflagging said data written to said target track; and
    (e) if data to be written to additional data tracks is in the buffer, repeating steps (a) through (e) until there is no data to be written remaining in the buffer.

12. The disk drive of claim 11 wherein the method acts further comprise, if at step (d) the PES during writing of data to said target track is greater than WI-2, thereby indicating the write head has encroached on an adjacent track, reading from the buffer data for said encroached adjacent track, flagging said encroached adjacent track as the target track, and repeating steps (b) through (d) for said flagged encroached adjacent track.

13. The disk drive of claim 11 wherein the method acts further comprise, if writing is inhibited due to exceeding the BFT, disabling high TMR mode if the PES is less than WI-1, whereby the controller is operable in normal mode.

14. The disk drive of claim 11 wherein WI-2 is greater than WI-1.

15. The disk drive of claim 11 wherein exceeding one or both of WI-1 and WI-2 thresholds comprises the PES continuously exceeding a predetermined threshold for a predetermined time period.

16. The disk drive of claim 11 wherein exceeding one or both of WI-1 and WI-2 thresholds comprises the PES exceeding a predetermined threshold a predetermined number of times within a predetermined time period.

* * * * *